US009909251B2

(12) United States Patent
Goodson

(10) Patent No.: US 9,909,251 B2
(45) Date of Patent: Mar. 6, 2018

(54) CLOTHES DRYER WITH DIELECTRIC FLANGED EXHAUST DUCT

(71) Applicant: Mark E Goodson, Corinth, TX (US)

(72) Inventor: Mark E Goodson, Corinth, TX (US)

( * ) Notice: Subject to any disclaimer, the term of this patent is extended or adjusted under 35 U.S.C. 154(b) by 44 days.

(21) Appl. No.: 15/208,317

(22) Filed: Jul. 12, 2016

(65) Prior Publication Data

US 2017/0016170 A1     Jan. 19, 2017

Related U.S. Application Data

(60) Provisional application No. 62/191,899, filed on Jul. 13, 2015.

(51) Int. Cl.
*D06F 58/20*     (2006.01)
*F16L 11/14*     (2006.01)

(52) U.S. Cl.
CPC ............... *D06F 58/20* (2013.01); *F16L 11/14* (2013.01)

(58) Field of Classification Search
CPC ................................. D06F 58/20; F16L 15/02
USPC ... 138/137, 140, 141, 109, DIG. 10, DIG. 3; 34/595, 86
See application file for complete search history.

(56) References Cited

U.S. PATENT DOCUMENTS

| 3,648,201 | A | * | 3/1972 | Gissel | H01P 3/14 29/600 |
| 4,577,664 | A | * | 3/1986 | Takahashi | E21B 17/003 138/143 |
| 5,318,328 | A | * | 6/1994 | Dawson | D06F 58/04 285/148.2 |
| 5,363,464 | A | * | 11/1994 | Way | H01P 3/12 333/212 |
| 6,463,673 | B1 | * | 10/2002 | Gherna | D06F 58/20 285/235 |
| 7,421,804 | B1 | * | 9/2008 | Hession | D06F 58/20 34/601 |
| 7,603,792 | B1 | * | 10/2009 | McDonald | F16L 15/02 34/140 |
| 2008/0110044 | A1 | * | 5/2008 | Ehlers | D06F 58/20 34/524 |

* cited by examiner

*Primary Examiner* — Patrick F Brinson
(74) *Attorney, Agent, or Firm* — David W. Carstens; Jeffrey G. Degenfelder; Carstens & Cahoon, LLP

(57) ABSTRACT

The improved dryer output exhaust duct of the present invention is comprised of a nonconductive, high temperature polymer to form a dielectric exhaust output duct. The dielectric dryer exhaust duct prevents the travelling of electrical current from an inadvertently energized dryer chassis to the attached flexible ducting and thus prevents the ducting from overheating or melting from the electrical current or igniting flammable materials nearby or contained within the ducting.

19 Claims, 4 Drawing Sheets

CLOTHES DRYER WITH DIELECTRIC FLANGED EXHAUST DUCT

CROSS-REFERENCE TO RELATED APPLICATION

This application claims the benefit of and priority to a U.S. Provisional Patent Application No. 62/191,899 filed Jul. 13, 2015, the technical disclosure of which is hereby incorporated herein by reference.

BACKGROUND OF THE INVENTION

Technical Field

The present invention relates generally to consumer and commercial appliances, and more particularly to consumer and commercial clothes dryers. This invention relates to clothes dryers having an improved output exhaust duct.

Background

Clothes dryers are a leading cause of residential fires in the United States. In 2010, clothes dryers and washing machines accounted for 4.5% of all reported home structure fires, 1.9% of associated civilian deaths, 2.8% of associated civilian injuries, and 3.1% of associated direct property damage. Clothes dryers accounted for 92% of these fires; washing machines 4%, and washer and dryer combinations accounted for 4%. The risk of fire is roughly equal for gas and electric dryers.

From 2006-2010, the National Fire Protection Association NFPA reported a yearly average of over 15 thousand dryer fires in the United States per year, resulting in a yearly average of 29 deaths, 402 injuries and approximately $192 million in direct property damage. The leading cause of home clothes dryer and washer fires was failure to clean 32%, followed by unclassified mechanical failure or malfunction 22%. Eight percent were caused by some type of electrical failure or malfunction. Out of these fires, the leading item first ignited in a clothes dryer fire was dust, fiber, or lint, causing 29% of the fires and 85% of the deaths.

Many fires are caused each year by ignition of the flexible exhaust ducting that carries lint and exhaust air from the clothes dryer exhaust outlet to a vent system that is part of the residence. Should the dryer chassis become inadvertently energized, the fault current is seen to flow through the "spring" (i.e., a coiled steel helix) that is part of the flexible exhaust duct. The steel, which is not a good conductor of electricity, will overheat and cause the plastic to melt and or ignite, as well as the internal lint to smolder and/or ignite. The exhaust duct is often made of a polymer, but sometimes made of aluminum foil that is very thin. In either case, energization of the steel or the foil can bring about this heating and/or arc production because of poor mating of the flexible exhaust duct and the dryer exhaust flange. In the alternative, the arcing can also occur between the flexible vent tubing and vent connection that is part of the residence.

The dryer has this exhaust duct output, whether of gas fired or electrical resistance heating design. While energization by AC current has been described, the same phenomenon has also occurred when the dryer chassis is energized by lightning.

There exists, therefore, a need in the art for a clothes dryer duct connection that will prevent an electrical current from traversing the ducting and/or its conductive steel helical spring, allowing this electrical charge to overheat or melt the ducting, igniting flammable materials such as lint. There also exists a need in the art for a duct connection that will prevent an electrical current from arcing between the ducting and the dryer or wall, thus igniting the flammable materials within or attached to the duct.

SUMMARY OF THE INVENTION

The present invention makes use of a dryer output exhaust duct with a flange that is dielectrically constructed.

The present mode of clothes dryer construction relies on ridged sheet metal for the output exhaust duct on the dryer. Typically, the exhaust duct (which is part of factory construction and constructed of rigid sheet metal) is conductive. Similarly, the external dryer vent built into residences is typically constructed of conductive metal. As a result, energization of the dryer chassis can lead to an electric current being conducted through the flexible exhaust ducting connecting the dryer to the external exhaust vent. This current can cause the ducting itself to overheat, melting or igniting the ducting and the lint inside. In addition, the current can cause electrical arcing between the ducting and the house or dryer. The electrical arc may ignite nearby flammable materials, such as lint.

The present invention overcomes this problem by introducing a high temperature polymer to the exhaust duct of the dryer. This dielectric material prevents any potential electrical current from being conducted through the flexible exhaust ducting attached to the dryer. Additionally, this dielectric duct can prevent arcing between ducting and the dryer chassis, dryer exhaust duct or the external exhaust duct in the wall. For purposes of this patent, a high temperature polymer is defined as one that in the intended usage does not suffer from chemical or mechanical changes that would make it unsuitable for its intended use. The exact temperature characteristics and composition of the polymer may well vary among different designs of clothes dryers.

In a first embodiment, the present apparatus calls for a nonconductive, high temperature polymer coating on the exterior surface of the sheet metal dryer exhaust duct. In this manner, the polymer serves as a dielectric bushing and will prevent the electrical current from traversing the conductive exhaust ducting and/or its conductive steel helical spring.

In a first aspect of the first embodiment, the nonconductive, high temperature polymer coating is painted over the sheet metal duct during the manufacturing process. In a second aspect of the first embodiment, the nonconductive, high temperature polymer is separately formed and affixed to the metal duct.

In an alternative embodiment, the exhaust duct is of all polymeric construction, such that once again a dielectric bushing is present. Such a duct can then be affixed to the dryer.

In either manner of construction, electrical fault current cannot flow down the external exhaust duct and seek ground, and during this process cause ignition of the duct and/or its lint contents. Similarly, if there is a poor fit between the dryer exhaust duct (which is now nonconductive) and the exhaust ducting and/or its conductive steel helical spring, electrical arcing cannot occur and ignite the lint.

BRIEF DESCRIPTION OF THE DRAWINGS

A more complete understanding of the apparatus of the present invention may be had by reference to the following detailed description when taken in conjunction with the accompanying drawings, wherein.

Figure 1A:
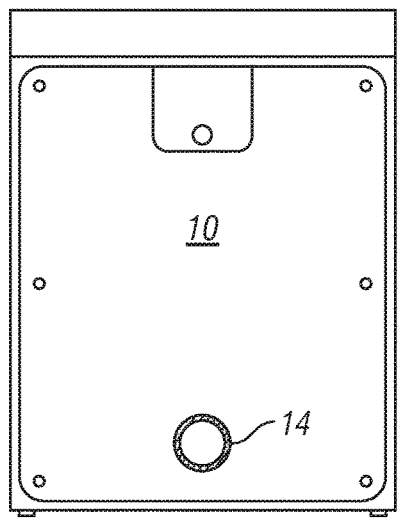
FIG. 1A is an elevation view of the rear of a present standard electric or gas dryer.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

DETAILED DESCRIPTION OF THE INVENTION

Figure 1B:
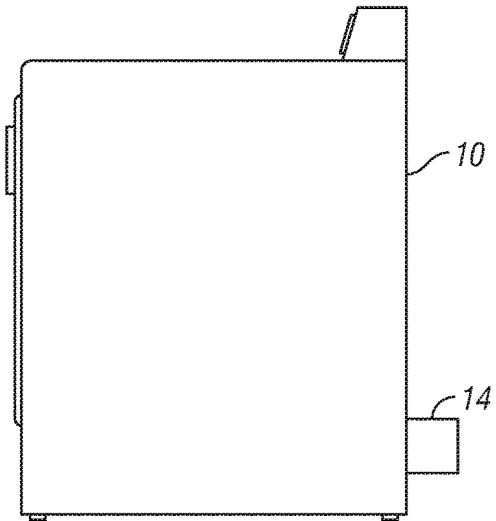
FIG. 1B is a side view of a present standard electric or gas dryer.

FIGS. 1A and 1B depict the back and side views, respectively, of a standard clothes dryer. The chassis 10 of the dryer is typically made of conventional sheet metal. The dryer exhaust duct 14 is typically a tubular structure crafted of the same conventional sheet metal as the rear metal chassis 10 of the dryer itself. The tubular dryer exhaust duct 14 protrudes from the rear chassis 10 of the dryer in order to facilitate the affixation of the flexible exhaust ducting 28 which conveys the exhaust from the dryer to the residence venting, such as an external exhaust duct 26 built into the wall 21 of a residence.

Figure 2A:
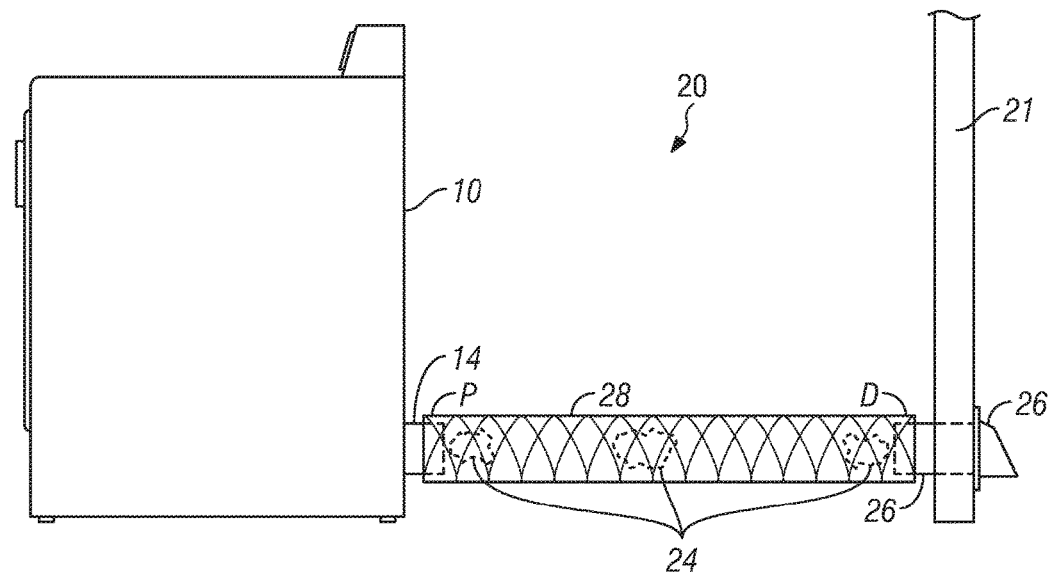
FIG. 2A illustrates a typical dryer exhaust ducting system.
Figure 2B:
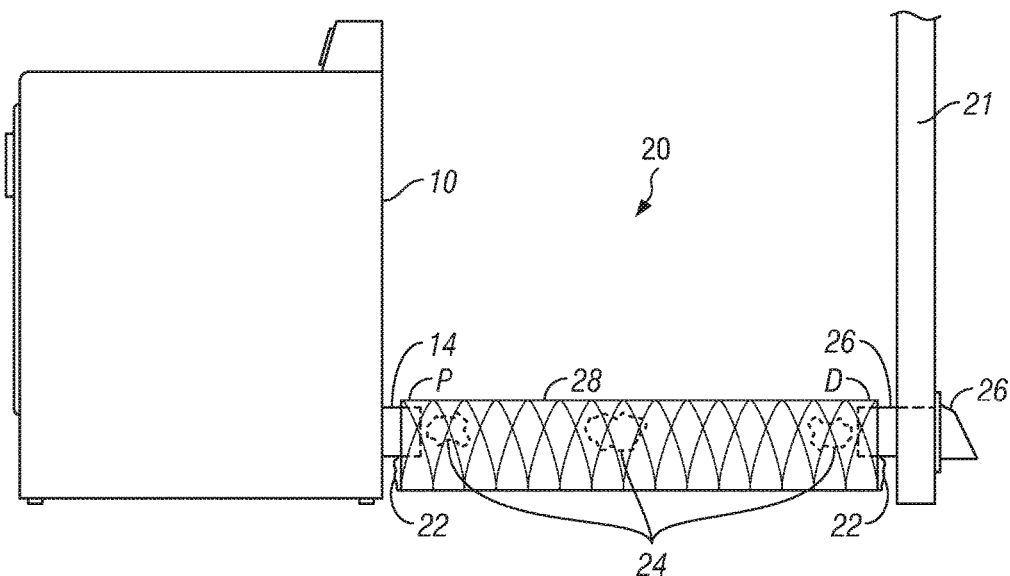
FIG. 2B illustrates a typical dryer duct system, wherein the flexible exhaust ducting is ill-fitted.

FIGS. 2A and 2B depict a visualization of the overall dryer ducting system 20. In the typical arrangement, the dryer exhaust duct 14 connects to a flexible exhaust ducting 28 that conveys the exhaust from the dryer to the external exhaust duct 26 built into the wall 21 of a residence. The flexible exhaust ducting 28 is typically comprised of a thin, conductive metal such as aluminum or of a nonconductive material such as vinyl. Where the flexible exhaust ducting 28 is comprised of a nonconductive material, the walls of the ducting typically contain a conductive steel helical spring, in order to retain the tubular shape of the ducting and prevent collapse. A proximate end P of the flexible exhaust ducting 28 fits over the tubular metal dryer exhaust duct 14 on the back of the dryer and a distal end D of the flexible exhaust ducting 28 is coupled with the tubular metal external exhaust duct 26 in the residence wall 21.

FIG. 2A depicts flexible exhaust ducting 28 fitted properly over the metal exhaust duct 14. FIG. 2B depicts the flexible exhaust ducting 28 affixed to the metal exhaust duct 26 but not fitted properly. In this visualization, a gap 22 is formed between the ends of the flexible exhaust ducting 28 and either the dryer exhaust duct 14 or the external exhaust duct 26.

One potential cause of fire is the ignition of dust, fiber, or lint in or near the dryer ducting system 20. The ignition of these flammable materials can be caused by overheating of the flexible exhaust ducting 28 connecting the dryer exhaust duct 14 on the back of the dryer chassis 10 to the external exhaust duct 26 built into a wall 21. The chassis 10 of the dryer can also become inadvertently energized, such as from the AC current or lightning. Should the dryer chassis 10 become energized, a fault electrical current can flow from the chassis 10 to the metal dryer exhaust duct 14 and from the dryer exhaust duct 14 be conducted through either the metal flexible exhaust ducting 28 itself or the coiled steel helix contained in the wall of other flexible exhaust ducting 28.

The electrical current can also continue to flow into a metal external exhaust duct 26, such as those built into a residence wall 21. The electrical current flowing through the metal can cause overheating of the dryer exhaust duct 14, the external exhaust duct 26, or the flexible exhaust ducting 28, resulting in the melting or ignition of the flexible exhaust ducting 28. This melting or ignition can cause the internal lint 24 to smolder or ignite, leading to a larger fire. In addition, the build-up of heat in the flexible exhaust ducting 28 can cause the lint 24 to smolder or ignite prior to the melting or ignition of the flexible exhaust ducting 28 itself. Once smoldering or ignited, the lint 24 contributes to the heat, thus accelerating the melting or ignition of the flexible exhaust ducting 28 and the larger subsequent fire.

These fires can also be caused by electrical arcing. Electrical arcing occurs when an electric current jumps across a gap between two conductive surfaces. Once the dryer chassis 10 has become charged, an electrical arc can form between the charged dryer exhaust duct 14 on the dryer chassis 10 and a poorly fitted flexible exhaust ducting 28, that has left a gap 22 between the end of the ducting 28 and the duct 14 itself, as shown in FIG. 2B. An electrical arc can also form between the dryer chassis 10 and the flexible exhaust ducting 28. The electrical arc can ignite flammable materials near the arc location such as lint 24 contained within the flexible exhaust ducting 28 or that has fallen out of the ducting due to the poor fit. The electrical arc also serves to further transfer the electrical current from the dryer chassis 10 and the flexible exhaust ducting 28.

Once the flexible exhaust ducting 28 is charged, arcing can also occur between the flexible exhaust ducting 28 and the external exhaust duct 26 contained within a residence wall 21 when the flexible exhaust ducting 28 is poorly fitted, leaving a gap 22 as in FIG. 2B. This arcing can also ignite the wall of the residence 21 or lint 24 contained within the external exhaust duct 26 and/or flexible exhaust ducting 28.

The disclosed apparatus solves this problem by introducing a nonconductive, high temperature polymer to the dryer exhaust duct 14 construction. This polymer serves as a dielectric bushing and prevents the electrical current from traversing the conductive flexible exhaust ducting 28 or the conductive coiled steel helix contained within the walls of the flexible exhaust ducting 28. The dielectric bushing also prevents arcing in the case of a poor fit between the flexible exhaust ducting 28 and either the dryer exhaust duct 14 or the external exhaust duct 26.

Figure 3A:
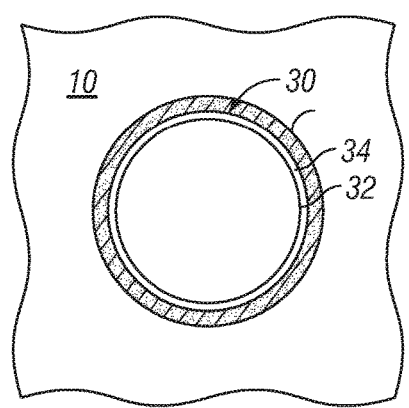
FIG. 3A is an end view depiction of an embodiment of the dielectric polymer coated dryer duct of the present invention.
Figure 3B:
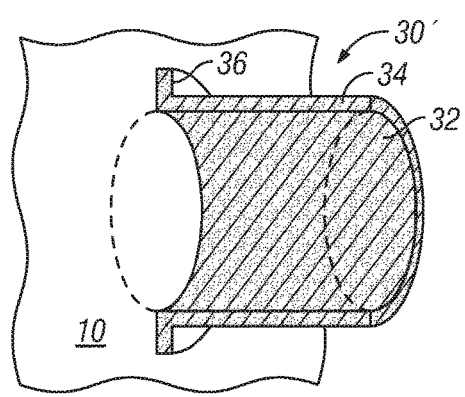
FIG. 3B is a cut-away, perspective depiction thereof.

One embodiment of this apparatus is shown in FIGS. 3A and B. In this embodiment, the dryer exhaust duct 30 is constructed out of conventional sheet metal. The dryer exhaust duct 30 is then coated with a nonconductive, high temperature polymer 34 forming a dielectric coating such that the sheet metal dryer exhaust duct 30 includes a sheet metal interior surface 32 and a dielectric coating 34 forms an exterior dielectric, high temperature surface. The flexible exhaust ducting 28 will now be fitted over the polymer surface of the dielectric duct 30 rather than directly over the conventional sheet metal dryer exhaust duct 14.

This embodiment can be additionally modified such that the nonconductive, high temperature polymer 34 also coats a portion of the dryer chassis 10 to form a dielectric shoulder 36 about one quarter inch wide. The addition of this dielectric shoulder 36 forms a dielectric flange that prevents the end of the attached flexible exhaust ducting 28 from making contact with the dryer chassis 10 at the proximate end P of the flexible exhaust ducting 28, thus further preventing the flow of electrical current from the dryer chassis 10 on to the flexible exhaust ducting 28 surface or coiled steel helix.

In an alternate aspect of this embodiment, the separate dielectric 30 duct can be crafted such that it will fit over and be affixed to the conventional metal dryer exhaust duct 14, accomplishing the same effect of the nonconductive, high temperature polymer 34 coating. This permits modification of an already manufactured dryer that currently possesses a conventional sheet metal dryer exhaust duct 14. An alternative to this embodiment would be to similarly coat or affix the nonconductive, high temperature polymer 34 to the external exhaust duct 26, thus preventing any external energy, such as from a nearby lightning strike, from being conducted via the metal external exhaust duct 26 from outside and back into the residence and through the dryer.

Figure 4A:
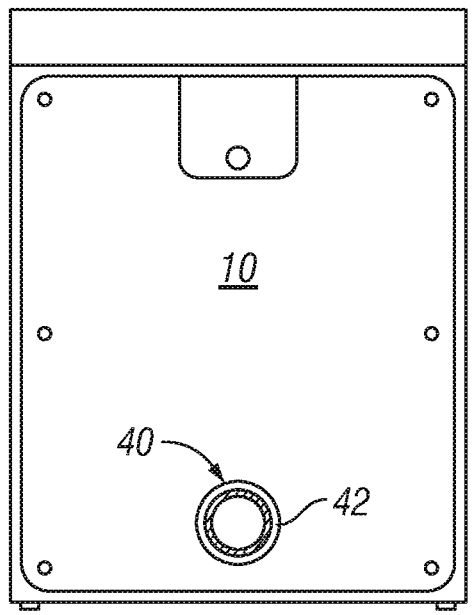
FIG. 4A is a view of the back of the standard electric or gas dryer having an embodiment of the dryer duct of the present invention that is formed from the dielectric polymer.
Figure 4B:
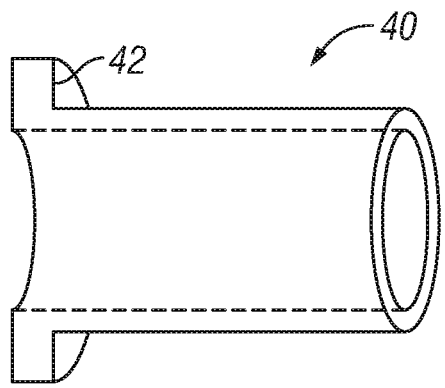
FIG. 4B illustrates close-up, cut-away view of the embodiment of the dryer duct of the present invention formed from the polymer.

In another embodiment, shown in FIGS. 4A and 4B, the dryer exhaust duct is formed entirely from the nonconductive, high temperature polymer. This creates a separate dielectric duct 40 that is then affixed to the dryer chassis 10. This separate dielectric duct 40 may also be crafted with a dielectric shoulder 42 such that the separate dielectric duct 40 forms a dielectric flange and the shoulder 42 performs the same function as the dielectric shoulder 36 in the previous embodiment, i.e. preventing the flexible exhaust ducting 28 from making direct contact with the dryer chassis 10. As with the previous embodiment, an alternative to this embodiment would be to additionally craft the external exhaust duct 26 entirely from the nonconductive, high temperature polymer.

Figure 5A:
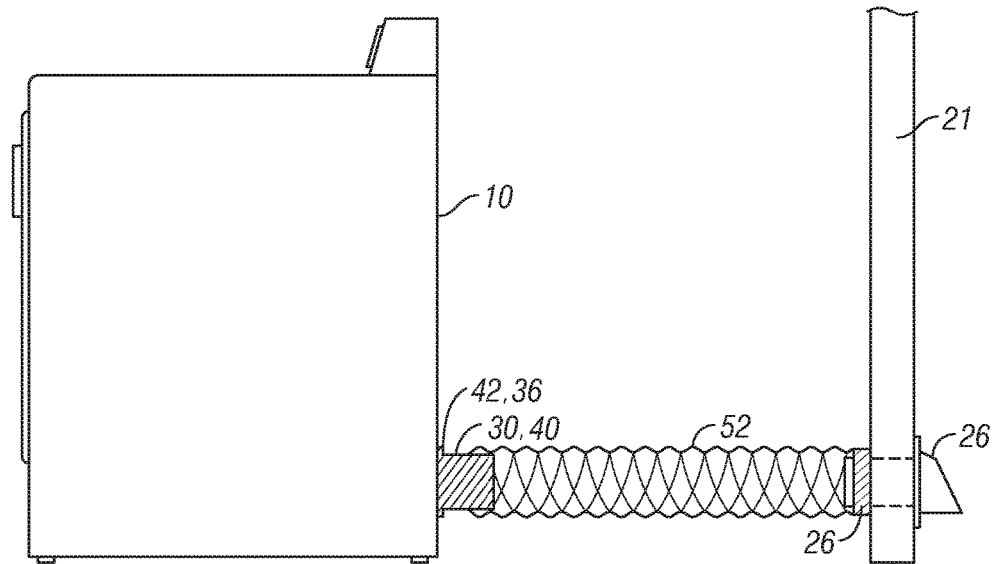
FIG. 5A is a diagram of the dielectric duct affixed to a dryer wherein the ducting is comprised of a conductive metal.
Figure 5B:
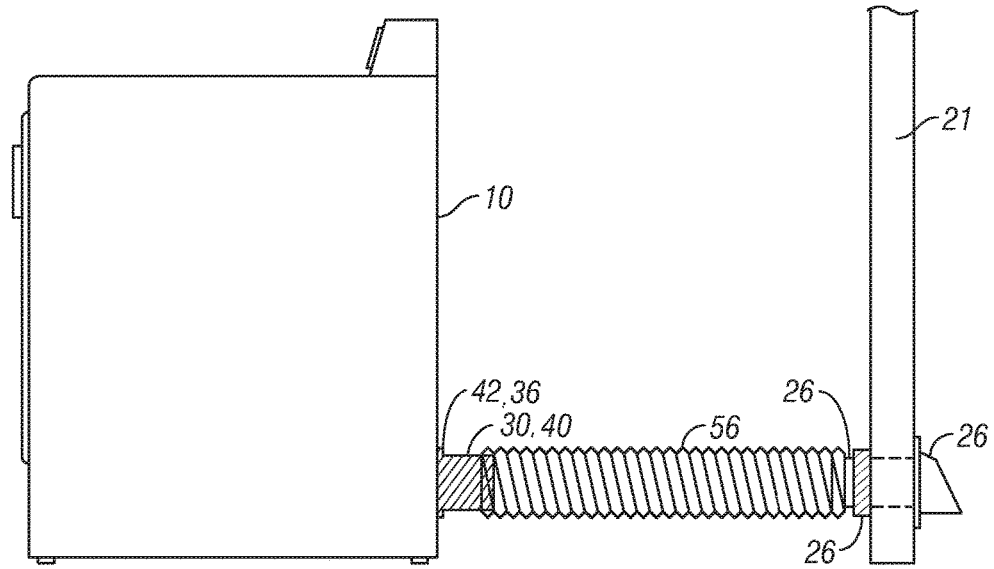
FIG. 5B is a diagram of the dielectric duct affixed to a dryer wherein the ducting is comprised of vinyl with a coiled steel helix spring embedded in the ducting walls.

The interposition of the different embodiments of the dielectric duct 30, 40 of the present invention, as shown in FIGS. 5A and 5B, prevents any electrical current from travelling from the dryer chassis 10 to the flexible exhaust ducting 28 via the metal dryer exhaust duct 14. Due to the nonconductive nature of the different embodiments of the dielectric ducts 30, 40 of the present invention, the electrical current is confined to the chassis of the dryer 10 and the metal dryer exhaust duct 14, which is no longer in contact with the flexible exhaust ducting 28. Thus prevented from traversing from dryer chassis 10 and exhaust duct 14 to the flexible exhaust ducting 28, the electrical current is prevented from arcing or overheating and melting the flexible exhaust ducting 28.

Where the flexible exhaust ducting is formed entirely of metal, as in FIG. 5A, the metal flexible exhaust ducting 52 is prevented from contacting potentially charged metal. The flexible exhaust ducting 52 contacts the dielectric flanged duct 30, 40 rather than directly with the conventional sheet metal duct 14. As a result, electrical current cannot flow from the dielectric duct 30, 40 to the metal flexible exhaust ducting 52. In addition, the dielectric shoulder 36, 42 forms a dielectric flange, which prevents the metal flexible exhaust ducting 52 from making direct contact with the dryer chassis 10, and thus preventing an electrical current from flowing directly from chassis 10 into the metal flexible exhaust ducting 52.

Similarly, as shown in FIG. 5B, when the flexible exhaust ducting 54 is partially made from a nonconductive material, such as vinyl, the flexible exhaust ducting 28 still contains a conductive coiled metal spring 56 within the walls of the flexible exhaust ducting 54. When the flexible exhaust ducting 54 is fitted onto a traditional metal dryer exhaust duct 14, the coiled metal spring 56 is able to conduct an electrical current from the metal dryer exhaust duct 14 and through the flexible exhaust ducting 54 similar to how the electrical current is conducted through a metal flexible exhaust ducting 52. As with the metal flexible exhaust ducting 52, the dielectric duct 30, 40 prevents the coiled metal spring 56 from making direct contact with either a conductive metal dryer exhaust duct 14 or a charged dryer chassis 10.

Additionally, should the flexible exhaust ducting 52, 54 be ill-fitted onto the embodiments of the dielectric duct 30, 40, the lack of conductivity in the dielectric duct 30, 40 prevents arcing between either the dryer exhaust duct 14 or the external exhaust duct 26 and the flexible exhaust ducting 52, 54. Thus, the embodiments of the dielectric duct 30, 40 of the present invention prevents an inadvertently charged dryer chassis 10 from energizing the flexible exhaust ducting 52, 54 or the external duct 26 and igniting flammable materials, such as lint 24. The additional imposition of the dielectric shoulder 36, 42 between the flexible exhaust ducting 28 and the dryer chassis 10 prevents arcing from occurring between the flexible exhaust ducting 52, 54 and the dryer chassis 10 itself.

Furthermore, the high temperature resistance nature of the embodiments of the dielectric duct 30, 40 prevents the dryer exhaust duct 14 or the external exhaust duct 26 from overheating and transferring heat to the attached flexible exhaust ducting 52, 54. Thus, the end of the flexible exhaust ducting 52, 54 attached to an embodiment of the dielectric duct 30, 40 is also prevented from overheating and transferring heat both down the flexible exhaust ducting 52, 54 itself and to the contents of the flexible exhaust ducting, such as lint.

It will now be evident to those skilled in the art that there has been described herein an improved dryer exhaust duct that, through the addition of a dielectric polymer, prevents the conduction of an electrical current through a piece of flexible exhaust ducting such that this electrical current cannot cause overheating or melting, igniting the ducting, lint, or surrounding materials. Additionally, the dielectric polymer duct of the present invention will also prevent potential arcing between a charged chassis and the flexible exhaust ducting, thus also preventing the flexible exhaust ducting from becoming charged and melting or igniting.

Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

The invention claimed is:

1. A clothes dryer comprising:
    a tubular dielectric exhaust duct having a dielectric shoulder formed from the nonconductive, high temperature polymer, wherein the dielectric duct comprises a nonconductive, high temperature polymer on its exterior surface.

2. The clothes dryer of claim 1, wherein the dielectric shoulder is comprised entirely of the nonconductive, high temperature polymer.

3. The clothes dryer of claim 1, wherein the dielectric shoulder comprises a portion of the dryer chassis coated with the nonconductive, high temperature polymer.

4. The clothes dryer of claim 1, wherein the dielectric shoulder is comprised of a metal shoulder coated with the nonconductive, high temperature polymer.

5. The clothes dryer of claim 1, wherein the dielectric shoulder extends at least 0.25" away from said tubular exhaust duct.

6. The clothes dryer of claim 1, wherein the tubular dielectric exhaust duct comprises a tubular sheet metal structure coated in the nonconductive, high temperature polymer.

7. The clothes dryer of claim 1, wherein the tubular dielectric exhaust duct comprises a tubular sheet metal structure having a nonconductive, high temperature polymer affixed over the tubular sheet metal structure.

8. The clothes dryer of claim 1, wherein the tubular dielectric exhaust duct is formed entirely of the nonconductive, high temperature polymer.

9. A clothes dryer exhaust duct comprising:
a tubular structure having a first end and a second end;
wherein said tubular structure comprises a nonconductive, high temperature polymer exterior surface;
wherein the first end further comprises a dielectric shoulder; and
wherein the shoulder extends about 0.25" away from said tubular structure.

10. The clothes dryer exhaust duct of claim 9, wherein said tubular structure comprises sheet metal having an exterior surface coated with a nonconductive, high temperature polymer.

11. The clothes dryer exhaust duct of claim 9, wherein said tubular structure is comprised entirely of a nonconductive, high temperature polymer.

12. The clothes dryer exhaust duct of claim 9, wherein said tubular structure comprises a nonconductive, high temperature polymer coating affixed to the surface of conventional sheet metal.

13. A dryer ducting system comprising:
a tubular dielectric dryer exhaust duct affixed to the dryer chassis, said dryer exhaust duct comprising a nonconductive, high temperature polymer exterior surface;
a flexible tubular exhaust ducting having a first end and a second end; and
a tubular external exhaust duct;
wherein said first end of the flexible tubular exhaust ducting is connected to the tubular dryer exhaust duct and said second end is connected to the tubular external exhaust duct.

14. The dryer ducting system of claim 13, wherein the dryer exhaust duct comprises a tubular structure constructed of sheet metal and coated with a nonconductive, high temperature polymer.

15. The dryer ducting system of claim 13, wherein the external exhaust duct comprises a tubular structure constructed of sheet metal and coated with a nonconductive, high temperature polymer.

16. The dryer ducting system of claim 13, wherein the dryer exhaust duct and the external exhaust duct each comprise a tubular structure constructed of sheet metal and coated with a nonconductive, high temperature polymer.

17. The dryer ducting system of claim 13, wherein the dryer exhaust duct and the external exhaust duct are formed entirely of a nonconductive, high temperature polymer.

18. The dryer ducting system of claim 13, wherein the dryer exhaust duct and the external exhaust duct are each comprised of a nonconductive, high temperature polymer coating affixed to the surface of the sheet metal.

19. The dryer ducting system of claim 13, wherein the portion of the dryer chassis, to which the dryer exhaust duct is affixed, is coated with a nonconductive, high temperature polymer coating.

* * * * *